US012618362B2

(12) United States Patent
Walton et al.

(10) Patent No.: US 12,618,362 B2
(45) Date of Patent: May 5, 2026

(54) METHODS AND APPARATUS TO PROVIDE CROSS-DIFFUSER BLEED

(71) Applicant: General Electric Company, Cincinnati, OH (US)

(72) Inventors: Edward James Walton, Scituate, MA (US); Keith W. Wilkinson, Portsmouth, NH (US); Michael Macrorie, Charlestown, MA (US); Caitlin Jeanne Smythe Almeida, Cambridge, MA (US); Michael T. Hogan, Tewksbury, MA (US); Elizabeth Bennett, Danvers, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/778,596

(22) Filed: Jul. 19, 2024

(65) Prior Publication Data

US 2026/0022656 A1 Jan. 22, 2026

(51) Int. Cl.
*F02C 6/08* (2006.01)
*B33Y 10/00* (2015.01)

(52) U.S. Cl.
CPC ............... *F02C 6/08* (2013.01); *B33Y 10/00* (2014.12); *F05D 2240/12* (2013.01); *F05D 2240/35* (2013.01)

(58) Field of Classification Search
CPC ... F02C 6/08; F02C 3/14; B33Y 10/00; F05D 2240/12; F05D 2240/35; F01D 9/048
See application file for complete search history.

(56) References Cited

U.S. PATENT DOCUMENTS

| | | | |
|---|---|---|---|
| 4,796,429 A | | 1/1989 | Verdouw |
| 5,555,721 A | | 9/1996 | Bourneuf et al. |
| 6,035,627 A | * | 3/2000 | Liu ..................... F04D 29/0513 415/176 |
| 6,155,777 A | | 12/2000 | Aschenbruck et al. |
| 6,280,139 B1 | * | 8/2001 | Romani ................ F04D 29/441 415/207 |
| 6,334,297 B1 | | 1/2002 | Dailey et al. |
| 8,220,276 B2 | | 7/2012 | Clemen et al. |
| 8,235,648 B2 | | 8/2012 | Leblanc |
| 8,556,573 B2 | | 10/2013 | Leblanc |
| 11,486,262 B2 | | 11/2022 | Wickersham et al. |
| 11,549,434 B2 | * | 1/2023 | Zysman ................... F02C 7/36 |
| 11,753,965 B1 | * | 9/2023 | Ganji ..................... F01D 25/24 60/785 |
| 2011/0265490 A1 | * | 11/2011 | Klasing .................... F02C 9/18 60/785 |
| 2017/0248155 A1 | | 8/2017 | Parker et al. |
| 2022/0056844 A1 | * | 2/2022 | Pearson ................... F02C 7/00 |

* cited by examiner

*Primary Examiner* — Rodolphe Andre Chabreyrie
(74) *Attorney, Agent, or Firm* — HANLEY, FLIGHT & ZIMMERMAN, LLC

(57) ABSTRACT

Systems, apparatus, articles of manufacture, and methods to provide for cross-diffuser bleed are provided herein. An example gas turbine engine includes a frame defining a cavity in a forward side of a diffuser of the gas turbine engine; a compressor including the diffuser, the diffuser defining a primary flow path to provide air flow to a combustor and including at least one conduit, the at least one conduit fluidly coupled to the cavity; and a downstream sink fluidly coupled to the cavity via the at least one conduit defining at least a portion of a bleed air path.

17 Claims, 10 Drawing Sheets

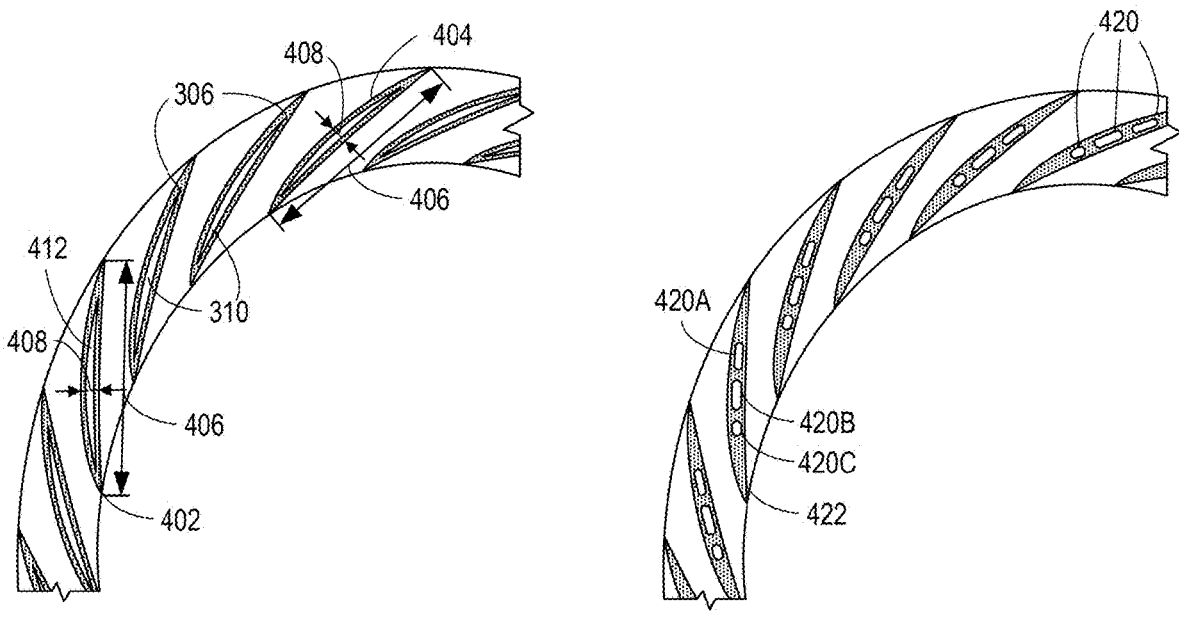
FIG. 4A
FIG. 4B
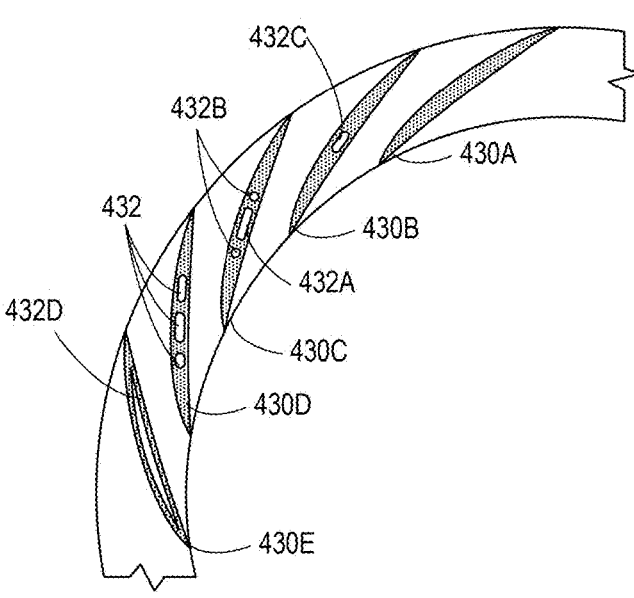
FIG. 4C

1000

START

1002

FORM AN INNER SHELL, THE INNER SHELL EXTENDING ALONG A CIRCUMFERENTIAL DIRECTION

1004

FORM AN OUTER SHELL, THE INNER SHELL AND THE OUTER SHELL DEFINING A PATHWAY

1006

FORM A PLURALITY OF SURFACES IN THE PASSAGEWAY

1008

FORM AT LEAST ONE CONDUIT IN THE OUTER SHELL AND AT LEAST ONE GAP BETWEEN RESPSECTIVE ONES OF THE PLURALITY OF SURFACES

END

METHODS AND APPARATUS TO PROVIDE CROSS-DIFFUSER BLEED

FIELD OF THE DISCLOSURE

This disclosure relates generally to diffuser assemblies and, more particularly, to methods and apparatus to provide cross-diffuser bleed.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Compressed air exiting the compressor section of the gas turbine engine typically has a high velocity. However, a typical combustion section of a gas turbine engine requires a high pressure, low velocity airflow to reduce the likelihood of flame-outs, to facilitate a stable and consistent burn, and to achieve an overall improved combustion process. Therefore, certain gas turbine engines include diffusers which are designed to recover the static pressure of compressed airflow by decreasing its velocity. Diffusers include a plurality of diffuser vanes to aid in reducing the velocity of the compressed airflow. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

A secondary purpose of the compressors, particularly the high-pressure compressor, is to provide bleed air (e.g., bleed) for use in other systems of the aircraft (e.g., cabin pressure, turbine cooling, air conditioning, sump pressurization, ice formation prevention, etc.). Bleed air is compressed air removed from the primary flow path in the compressor section, upstream of the fuel-burning sections of the gas turbine engine.

BRIEF DESCRIPTION OF THE DRAWINGS

FIG. 4A is a cross-sectional view of a portion of the example diffuser of FIG. 2 taken along line 9-9 of FIG. 3 in accordance with the teachings of this disclosure.

FIG. 4B is a cross-sectional view of another embodiment of the diffuser of FIG. 2 taken along line 9-9 of FIG. 3 in accordance with the teachings of this disclosure.

FIG. 4C is a cross-sectional view of another embodiment of the diffuser of FIG. 2 taken along line 9-9 of FIG. 3 in accordance with the teachings of this disclosure.

Figure 1:
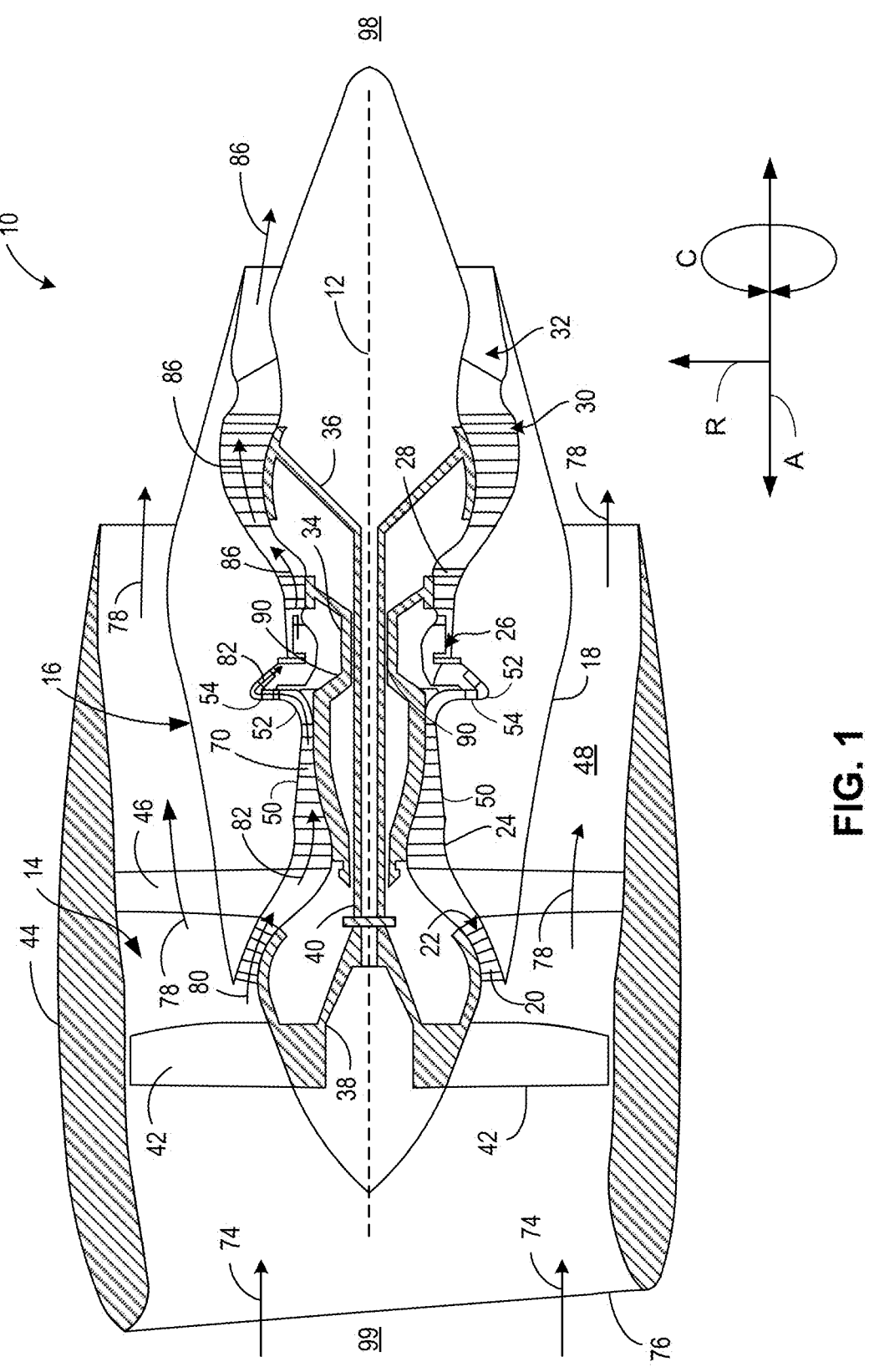
FIG. 1 is a cross-sectional view of an example engine in which examples disclosed herein may be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe example implementations and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Bleed air is routed from the compressor section of gas turbine engines for use in other systems of the aircraft via a bleed air system. Bleed air systems use a network of ducts (e.g., tubes, pipes, etc.) and valves to route bleed air from the compressor section to various locations within the aircraft for a number of bleed air functions. Such bleed air functions include, but are not limited to providing cabin pressure, turbine cooling, air conditioning, sump pressurization, ice formation prevention, and powering an engine starter.

Some known bleed air systems utilize pipes, fittings, and check valves external to the engine to route the bleed air to its destination. External routing of the bleed air requires abatements to combat potential damage to the external components of the bleed air system that can occur during installation, maintenance, and use caused by, for example, foreign objects. Such abatements include, for instance, check valves and redundant flow paths, which add to the part count of the system, required maintenance, and installation steps. Beyond existing bleed air systems being maintenance-intensive, the network of external ducts and valves also contributes to the overall weight of the engine. As gas turbine engines become smaller, the weight of the external components of existing bleed air systems takes up a larger percentage of the overall weight of the engine, limiting range and increasing fuel consumption of the engine. As a result, existing aircrafts suffer from sub-optimal engine performance due to the added weight of external bleed air systems, compromise on functions which use bleed air, or require alternative mechanisms to enable such functions, which also adds to the overall weight of the aircraft.

Methods, systems, and apparatus disclosed herein route bleed air internally within the gas turbine engine. Bleed air systems disclosed herein include a radial diffuser with at least one bleed conduit (e.g., conduit) to route bleed air from a forward side of the diffuser to an aft side of the diffuser. As used herein, the "forward" side and the "aft" side of the diffuser are defined relative to a main flow path that turns radially through the diffuser. The forward side of the diffuser is along the main flow path in the direction of an upstream compressor. The aft side of the diffuser is along the main flow path in the direction of a downstream turbine.

Methods, systems, and apparatus disclosed herein include a frame defining a bleed cavity (e.g., cavity) in a forward side of a diffuser, a combustor, and a downstream sink. In examples disclosed herein, the compressor includes a diffuser that has a plurality of surfaces defining a plurality of discrete passageways to provide air flow to a downstream combustor. In some examples, the plurality of surfaces is a plurality of diffuser vanes, a plurality of pipes, a plurality of holes, etc. At least one bleed conduit is included between respective ones of the plurality of surfaces to enable bleed air to flow from a forward side of the diffuser to the aft side of the diffuser. In some examples, a number of gaps between discrete passageways that include at least one bleed air conduit, a number of bleed air conduits included in said gaps, a size of the at least one bleed conduits, and a shape of the at least one bleed conduit may be determined based on a number of design considerations including, but not limited to: an amount of bleed air required for bleed air functions, a size of the gaps, a shape of the gaps, a number of gaps in the diffuser, a distance between gaps, etc. For example, the at least one bleed conduit may have an elliptical cross-sectional shape to enable a sufficient supply of bleed air through the diffuser.

In some examples, the surfaces are additively manufactured with at least one bleed conduit. In other examples, the diffuser is machined, brazed, or welded. For example, the at least one bleed conduit may be drilled into the diffuser in the gaps. In some examples, the diffuser is an integral piece. In other examples, the diffuser consists of multiple pieces assembled together.

In some examples, at least one passage is fluidly coupled to the bleed conduit on the aft side of the diffuser and the at least one passage receives bleed air from the bleed cavity via the bleed conduit. In some examples, the gas turbine engine includes a tube coupled to the diffuser, the tube fluidly coupled to the bleed cavity via the at least one bleed conduit. The number of passages, the size of the passage(s), and the shape of the passage(s) depends on, for example, an amount of bleed air for bleed air functions, a number of aircraft and/or engine systems that require bleed air, a number of gaps that include at least one bleed conduit, a number of bleed conduits, and an available amount of space in the engine for the passage(s). In some examples, the bleed air system is a passive bleed air system, meaning bleed air is provided to the downstream sinks without intervention from a control system. In other examples, the at least one passage includes at least one fluid control valve and at least one controller to control an amount of bleed air routed to the at least one downstream sink. For example, the at least one controller may determine an aircraft and/or engine system no longer needs a supply of bleed air and activate the at least one fluid control valve to restrict the flow of bleed air to a first one of the at least one downstream sink.

Bleed air systems disclosed herein provide bleed air to downstream sinks via a bleed air path internal to the gas turbine engine with a reduced bleed air path length, a reduced part count, reduced weight, reduced cost, improved durability, and improved maintainability. Bleed air systems disclosed herein also enable reduced nacelle drag by reducing the frontal area of the engine because of the removal of external bleed air system components. In some examples, the bleed air system is incorporated entirely within the gas turbine engine. By containing the entire bleed air system internal to the gas turbine engine, the need for abatements to combat potential damage to the external components of the bleed air system that can occur during installation, maintenance, and use is circumvented. In some examples, the bleed air system does not include any check valves or redundant flow paths.

Referring now to the drawings, FIG. 1 is a cross-sectional view of an example engine 10 (e.g., a turbofan gas turbine engine). As shown in FIG. 1, the engine 10 has a longitudinal or axial centerline axis 12 that extends therethrough for reference purposes. The engine 10 further defines an upstream end 99 and a downstream end 98 for reference. In general, the engine 10 may include a fan assembly 14 and a core engine 16 disposed downstream from the fan assembly 14. For reference, the engine 10 defines an axial direction A, a radial direction R, and a circumferential direction C. In general, the axial direction A extends parallel to the axial centerline axis 12, the radial direction R extends outward from and inward to the axial centerline axis 12 in a direction orthogonal to the axial direction A, and the circumferential direction extends three hundred sixty degrees (360°) around the axial centerline axis 12.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustor 26, an expansion section or turbine section including a high pressure (HP) turbine 28, a low pressure (LP) turbine 30 and a jet exhaust nozzle section 32. The HP compressor 24 includes a high pressure, multiple stage axial compressor 50 and a single stage centrifugal compressor 52 as a final compressor stage. The single stage centrifugal compressor 52 includes a diffuser 54. In some examples, the diffuser 54 can be implemented with the novel structures disclosed herein in connection with FIGS. 2-7. Outlet guide vanes (OGVs) are disposed between the multiple stage axial compressor 50 and the single stage centrifugal compressor 52. The HP compressor 24 includes a forward casing and an aft casing. The forward casing generally surrounds the axial compressor 50 and the aft casing generally surrounds the centrifugal compressor 52.

A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1, the LP rotor shaft 36 is connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced OGVs or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44 or omit the nacelle 44 from extending around the fan blades 42.

It should be appreciated that combinations of the shafts 34, 36, the compressors 22, 24, and the turbines 28, 30 define a rotor assembly 90 of the engine 10. For example, the HP rotor shaft 34, HP compressor 24, and HP turbine 28 may define a high speed or HP rotor assembly of the engine 10. Similarly, combinations of the LP rotor shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly that is at least partially mechanically de-coupled from the LP spool via the fan shaft 38 and the reduction gear 40. Still further examples may further define one or more intermediate rotor assemblies (not shown) defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through the annular inlet 20 defined at least partially via the outer casing 18. The flow of air is provided in serial flow through the compressors 22, 24, the combustor 26, and the expansion section via a core flow path 70. The flow of air 80 is increasingly compressed as it flows across successive stages of the compressors 22, 24, such as shown schematically by arrows 82. The flow of air 80 is increasingly compressed as it flows across successive stages of the multiple stage axial compressor 50. Compressed air is discharged from an impeller of the centrifugal compressor 52 and directly into the diffuser 54, then through a deswirler and into the combustor 26.

The compressed air 82 enters the combustor 26 and mixes with a liquid and/or gaseous fuel and is ignited to produce combustion gases 86. It should be appreciated that the combustor 26 may form an appropriate system for generating combustion gases, including, but not limited to, deflagrative or detonative combustion systems, or combinations thereof. The combustor 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1 depicts and describes a two-stream engine having the fan flow passage 48 and the core flow path 70. The example depicted in FIG. 1 has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

Figure 2:
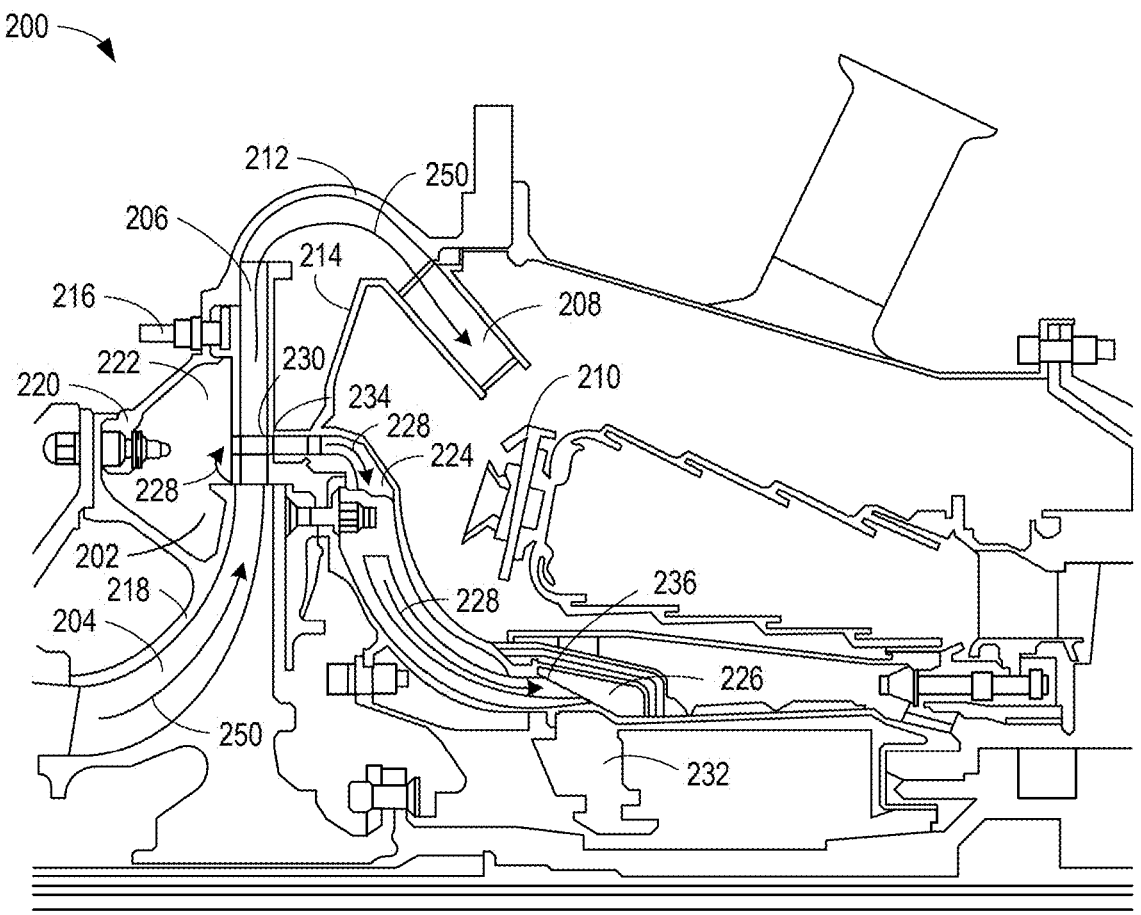
FIG. 2 is a cross-sectional view of a portion of an example engine including an example bleed air system with an example diffuser in accordance with the teachings of this disclosure.

FIG. 2 illustrates an example gas turbine engine 200 including an example bleed air system 202. The example gas turbine engine 200 includes the example bleed air system 202, an example impeller 204, an example diffuser 206, an example deswirler 208, and an example combustor 210. In the illustrated example of FIG. 2, the diffuser 206 and the deswirler are joined using an outer frame member 212 and an inner frame member 214. In addition, a plurality of fasteners 216 are used to join these various parts together and secure diffuser 206 and deswirler 208 in the gas turbine engine 200. An impeller shroud 218 surrounds the impeller 204 and defines an outer flowpath surface closely surrounding impeller blades of the impeller 204. In some examples, the diffuser 206 may be integrally formed with the deswirler 208, the outer frame member 212, the impeller shroud 218, and/or an example frame 220 defining a bleed cavity 222.

The example bleed air system 202 includes the example frame 220 defining the bleed cavity 222, the example diffuser 206, an example passage 224, and an example port 226. The example bleed air system 202 is a passive bleed air system. In other examples, the bleed air system 202 may be an active bleed air system. The example bleed cavity 222 receives bleed air 228 from the main flow path 250. The diffuser 206 routes bleed air 228 from a forward side of the diffuser 206 to the aft side of the diffuser 206 via an example bleed conduit 230. The passage 224 receives the bleed air 228 on the aft side of the diffuser 206 and routes the bleed air 228 to at least one downstream sink 232 for use by at least one aircraft or engine system. In some examples, the bleed air 228 travels from the forward side of the diffuser

206 to the aft side of the diffuser 206 entirely internal to the gas turbine engine 200. In some examples, the example passage 224 includes at least one fluid control valve and at least one controller to control an amount of bleed air 228 routed to the at least one downstream sink 232. For example, the at least one controller may determine an aircraft and/or engine system no longer needs a supply of bleed air 228 and activate the at least one valve to restrict the flow of bleed air 228 to a first one of the at least one downstream sink.

In some examples, the bleed air system 202 is incorporated entirely within the gas turbine engine 200. By incorporating the entire bleed air system 202 within the gas turbine engine 200, the need for abatements to combat potential damage to the external components of the bleed air system 202 that can occur during installation, maintenance, and use is prevented. For example, the bleed air system 202 can eliminate check valves or redundant flow paths that would otherwise be necessary in a traditional, external design.

The diffuser 206 includes a plurality of diffuser vanes (not shown in FIG. 2, refer to FIG. 3) defining a plurality of discrete passageways (not shown in FIG. 2, refer to FIG. 3) to provide a primary flow path of air to the combustor 210. In other examples, the diffuser 206 includes a plurality of pipes, a plurality of holes, etc. to define the primary flow path. The example bleed conduit 230 is included in one of the plurality of diffuser vanes. In some examples, the diffuser 206 includes more than one bleed conduit 230 (e.g., two bleed conduits, three bleed conduits, four bleed conduits, etc.) in more than one diffuser vane (e.g., two diffuser vanes, three diffuser vanes, etc.). For example, the diffuser 206 may include a first bleed conduit 230 in a first diffuser vane and a second bleed conduit 230 in a second diffuser vane. In some examples, a number of bleed conduits 230 and a number of diffuser vanes including at least one bleed conduit 230 is determined based on at least one of a number of factors, including but not limited to: an amount of bleed air 228 required for bleed air functions, a size of the diffuser vanes, a shape of the diffuser vanes, a number of diffuser vanes in the diffuser 206, and a distance between diffuser vanes.

The cross-sectional shape of the bleed conduit(s) 230 can be circular, elliptical, square, triangular, rectangular, or other two-dimensional geometric shape. In some examples, the cross-sectional shape of the bleed conduit(s) 230 vary along the length of the bleed conduit(s) 230. For example, the bleed conduit 230 may have an elliptical cross-sectional shape at a first end of the bleed conduit 230 and a circular cross-sectional shape at a second end of the bleed conduit 230. In some examples, the cross-sectional shape of the bleed conduit(s) 230 is rounded to reduce the stress concentration caused by stress raisers (e.g., sharp corners, grooves, notches, etc.).

In some examples, the shape of the bleed conduit(s) 230 may be determined based on a number of factors including, but not limited to: an amount of bleed air required for bleed air functions, a size of the diffuser vanes, a shape of the diffuser vanes, a number of diffuser vanes in the diffuser, and a distance between diffuser vanes. For example, the shape of the bleed conduit(s) 230 may have an elliptical cross-section to accommodate an amount of bleed air 228 needed to pass through the diffuser 206. In that example, the elliptical cross-section may enable a higher cross-sectional area for the bleed conduit(s) 230 than other shapes due to the ratio of the length of the diffuser vanes to the width of the diffuse vanes. In some examples, a first bleed conduit 230 has a first cross-sectional shape and a second bleed conduit 230 has a second cross-sectional shape. For example, the first bleed conduit 230 may have a first cross-sectional shape of a filleted (e.g., rounded) rectangle in a first portion of the diffuser vane, and a second cross-sectional shape of a circle in a second portion of the diffuser vane near a tip of the diffuser vane. The cross-sectional shape of the bleed conduit 230 can be any shape internal to the diffuser vane that provides a sufficient flow area for the downstream sink 232.

In some examples, the diffuser vanes of the diffuser 206 are cast or additively manufactured with at least one bleed conduit 230. In other examples, the diffuser 206 is machined, brazed, or welded. For example, the at least one bleed conduit 230 may be drilled into the diffuser vanes after the diffuser vanes are brazed to the rest of the diffuser 206. In some examples, the diffuser 206 is an integral piece. In other examples, the diffuser 206 consists of multiple pieces assembled together.

The example passage (e.g., tube, pipe, etc.) 224 is coupled to the diffuser 206 at a first end 234. In the illustrated example of FIG. 2, the passage 224 extends through an entrance 236 provided by the port 226 and couples to the at least one downstream sink 232 at a second end (not shown in FIG. 2). In some examples, the number of passages 224, the size of the passage(s) 224, and the shape of the passage(s) 224 depends on, for example, an amount of bleed air 228 required for bleed air functions, a number of aircraft and/or engine systems that require bleed air 228, a number of diffuser vanes that include at least one bleed conduit 230, a number of bleed conduits 230, and an available amount of space in the gas turbine engine 200 for the passage(s) 224.

Figure 3:
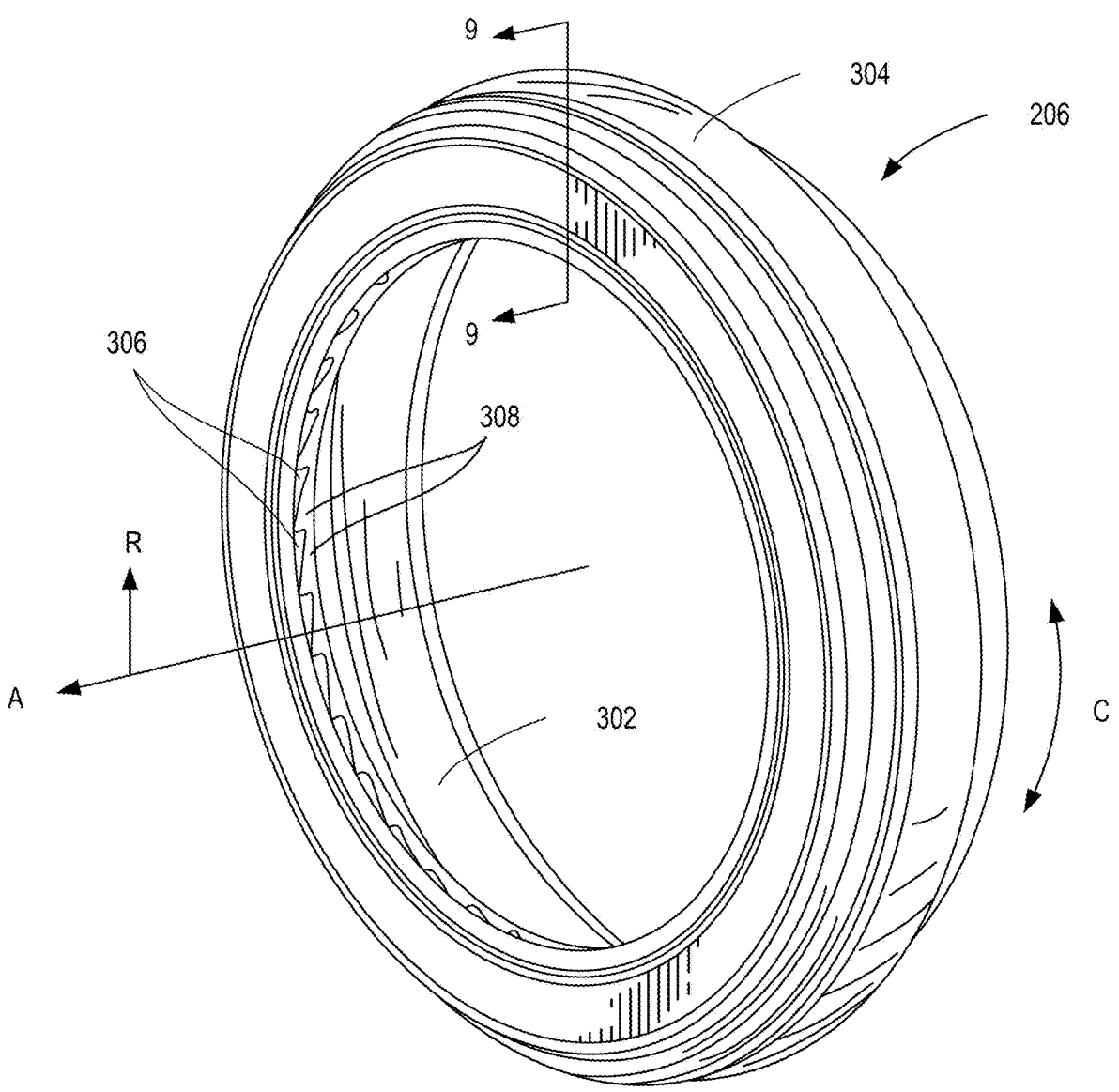
FIG. 3 is a perspective view of the example diffuser of FIG. 2 in accordance with the teachings of this disclosure.

FIG. 3 is a perspective view of the example diffuser 206. As illustrated, the diffuser 206 includes an annular inner shell 302, an outer shell 304, and a plurality of diffuser vanes 306. The inner shell 302 and the outer shell 304 extend along the circumferential direction C and are spaced apart from each other in the radial direction R to define a flow passageway. The diffuser vanes 306 are positioned within the flow passageway such that the inner shell 302, the outer shell 304, and the diffuser vanes 306 define a plurality of fluid passageways 308. In the example of FIG. 3, the plurality of surfaces are the diffuser vanes 306. More specifically, the diffuser vanes 306 extend between the inner shell 302 and the outer shell 304 to divide the flow passageway into the plurality of fluid passageways 308 and split a flow of compressed air. In the illustrated example of FIG. 3, the diffuser 206 includes thirty-six diffuser vanes 306 (not all shown) defining thirty-six fluid passageways 308 (not all shown) spaced evenly about the circumferential direction C. However, it should be appreciated that according to alternative embodiments, a suitable number of diffuser vanes 306 may be used, e.g., more than twenty diffuser vanes 306, more than thirty diffuser vanes 306, etc. In some examples, the diffuser vanes 306 are not spaced evenly about the circumferential direction C. At least one diffuser vane of the plurality of diffuser vanes 306 includes at least one bleed conduit 310 (shown in FIG. 4A) to route bleed air from the forward side of the diffuser 206 to the aft side of the diffuser 206. In some examples, the at least one bleed conduit 310 receives bleed air from a bleed cavity in the forward side of the diffuser 206 and routes the bleed air to at least one passage on the aft side of the diffuser 206.

FIG. 4A is a cross-sectional view of a portion of the example diffuser 206 taken along line 9-9 of FIG. 3. In the illustrated example of FIG. 4A, the diffuser 206 includes a plurality of diffuser vanes 306. For the sake of clarity, two diffuser vanes 306 are labeled, but more diffuser vanes 306 are illustrated in FIG. 4A. The plurality of diffuser vanes 306 include a first diffuser vane 402 and a second diffuser vane 404. The first diffuser vane 402 has a length 406 and a width 408 at its widest point. In some examples, the length 406 of the first diffuser vane 402 is different than a length 406 of the second diffuser vane 404. In some examples, the width 408 of the first diffuser vane 402 is different than a width 408 of the second diffuser vane 404. The first diffuser vane 402 includes a bleed conduit 412. In some examples, the first diffuser vane 402 includes more than one bleed conduit 412 (e.g., two bleed conduits, three bleed conduits). The bleed conduit 412 receives bleed air 228 from a bleed cavity 222 (not shown in FIG. 4A) positioned on a forward side of the diffuser 206, the bleed air 228 to travel through the diffuser 206 via the bleed conduit 412. The bleed air 228 then travels to the at least one downstream sink 232 (not shown in FIG. 4A) positioned on the aft side of the diffuser 206.

In the illustrated example, the bleed conduit 412 has an elliptical cross-sectional shape. In other examples, the bleed conduit 412 has a cross-sectional shape that is circular, rectangular, square, triangular, or other two-dimensional geometric shape. In some examples, the size and shape of the bleed conduit 412 may be determined based on a number of factors including, but not limited to: an amount of bleed air 228 required for bleed air functions, a size of the first diffuser vane 402, a shape of the first diffuser vane 402, a number of diffuser vanes 306 in the diffuser 206, and the distances between the first diffuser vane 402 and the second diffuser vane 404. For example, the size of the bleed conduit 412 is limited by the length 406 and the width 408 of the first diffuser vane 402. FIGS. 4B and 4C are cross-sectional views of alternative embodiments of the example diffuser 206. In the illustrated example of FIG. 4B, the diffuser vanes 306 each include three bleed conduits 420. For example, a first diffuser vane 422 includes a first bleed conduit 420A, a second bleed conduit 420B, and a third bleed conduit 420C. In the illustrated example of FIG. 4B, the first, second, and third bleed conduits 420A-C each have a cross-sectional area with a rounded rectangular shape. In other examples, the shape of a cross-sectional area of one or more of the first, second, and/or third bleed conduit 420A-C differs from the shape of a cross-sectional area of the other of the first, second, and/or third bleed conduits 420A-C. The example second bleed conduit 420B is positioned in the center of the first diffuser vane 422 and has a larger cross-sectional area than the first bleed conduit 420A, which in turn has a larger cross-sectional area than the third bleed conduit 420C. In some examples, any of the cross-sectional areas of the first, second, and third bleed conduits 420A-C may be larger and/or smaller than illustrated in FIG. 4B. For example, the third bleed conduit 420C may have the largest cross-sectional area of the first, second, and third bleed conduits 420A-C in some examples.

In the illustrated example of FIG. 4C, the diffuser vanes 306 include a first diffuser vane 430A, a second diffuser vane 430B, a third diffuser vane 430C, a fourth diffuser vane 430D, and a fifth diffuser vane 430E. The first diffuser vane 430A does not include a bleed conduit, the second diffuser vane 430B and the fifth diffuser vane 430E include one bleed conduit 432, and the third diffuser vane 430C and the fourth diffuser vane 430D include three bleed conduits 432. In some examples, the cross-sectional shape of the bleed conduits 432 vary within a single diffuser vane 430A, 430B, 430C, 430D, 430E. For example, the third diffuser vane 430C includes a first bleed conduit 432A having a rounded rectangular cross-sectional shape and second bleed conduits 432B having a circular cross-sectional shape. In some examples, the cross-sectional shape of the bleed conduits varies across the diffuser vanes 430A, 430B, 430C, 430D, 430E. For example, the bleed conduit 432C of the second diffuser vane 430B has a rounded rectangular cross-sectional shape and the bleed conduit 432D has an elongated crescent cross-sectional shape.

In other examples, at least one of the first, second, third, fourth, and/or fifth diffuser vanes 430A-E includes more or fewer bleed conduits 432 than the at least one of the first, second, third, fourth, and/or fifth diffuser vanes 430A-E includes in FIG. 4C. In some examples, numbers of bleed conduits included the first, second, third, fourth, and/or fifth diffuser vanes 430A-E are determined based on at least one of a number of factors, including but not limited to: an amount of bleed air 228 for bleed air functions, sizes of the diffuser vanes 430A-E, shapes of the diffuser vanes 430A-E, a number of diffuser vanes 306 in the diffuser 206, and a distance between the diffuser vanes 306.

In some examples, the structural design of the diffuser vanes 430A-E and the arrangement of bleed conduits 432 in the diffuser vanes 430A-E depend on a number of design parameters, including but not limited to bleed air flow requirements, weight of the diffuser 206, local loads experienced by the diffuser vanes 430A-E, such as loads caused by pressure differentials, and engine carcass loads. For example, inclusion of the bleed conduits 432 in the diffuser vanes 430A-E may hinder the ability of the diffuser vanes 430A-E to withstand forces they are subjected to in the compressor. In some examples, a metal surface of the diffuser vanes 430A-E surrounding the bleed conduits 432 provides structural support for the diffuser vanes 430A-E.

Figure 5:
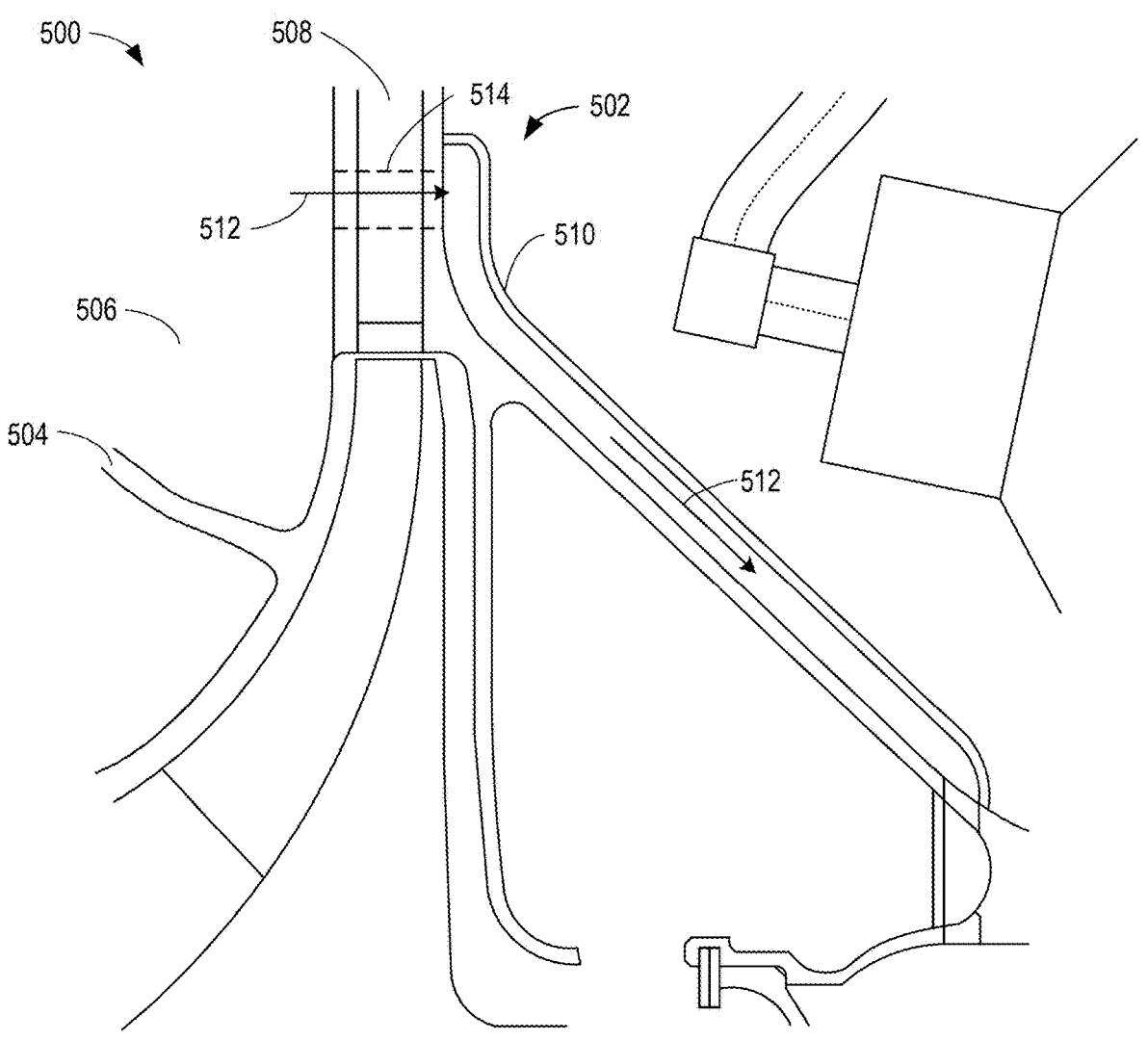
FIG. 5 is a cross-sectional view of another example bleed air system with another example diffuser in accordance with the teachings of this disclosure.

FIG. 5 illustrates a portion of another example engine 500. The engine 500 includes example bleed air system 502. The example bleed air system 502 includes an example impeller shroud 504 defining a bleed cavity 506, the example diffuser 508, and an example plurality of passages 510. The example bleed cavity 506 receives bleed air 512 from a primary flow path of a compressor of the engine 500. The diffuser 508 includes a bleed conduit 514. The diffuser 508 routes the bleed air 512 from a forward side of the diffuser 508 to the aft side of the diffuser 508 via the bleed conduit 514. The plurality of passages 510 receives the bleed air 512 on the aft side of the diffuser 508 and routes the bleed air 512 to at least one downstream sink (not shown in FIG. 5) for use by at least one aircraft and/or engine system. In some examples, the bleed air 512 travels from the forward side of the diffuser 508 to the aft side of the diffuser 508 entirely internal to (e.g., within) the engine 500. In some examples, the plurality of passages 510 include at least one fluid control valve and at least one controller to control an amount of bleed air 512 routed to the at least one downstream sink. For example, the at least one controller may determine that an aircraft and/or engine system no longer needs a supply of bleed air 512 and activates the at least one valve to restrict the flow of bleed air 512 to a first one of the at least one downstream sink.

In some examples, the bleed air system 502 is incorporated entirely within (e.g., internal to) the engine 500. By containing the entire bleed air system 502 internal to the engine 500, the need for abatements to combat potential damage to the external components of the bleed air system 502 that can occur during installation, maintenance, and use is reduced or eliminate. For example, the bleed air system 502 may not include any check valves or redundant flow paths that are necessary in an external implementation.

In some examples, the plurality of passages 510 are additively formed. In some examples, the plurality of passages 510 are separate from each other. In other examples, the plurality of passages 510 are ganged together. In some examples, the plurality of passages 510 includes a first group of passages ganged together and a second group of passages ganged together, the first group of passages and the second group of passages separate from each other. A number of the plurality of passages 510, a size of the plurality of passages 510, and a shape of the plurality of passages 510 may be determined by a number of factors including, for example, an amount of bleed air 512 for bleed air functions, a number of aircraft and/or engine systems that use bleed air 512, a number of surfaces that include at least one bleed conduit 514, a number of bleed conduits 514, and an amount of space in the engine 500 available for the plurality of passages 510.

Figure 6:
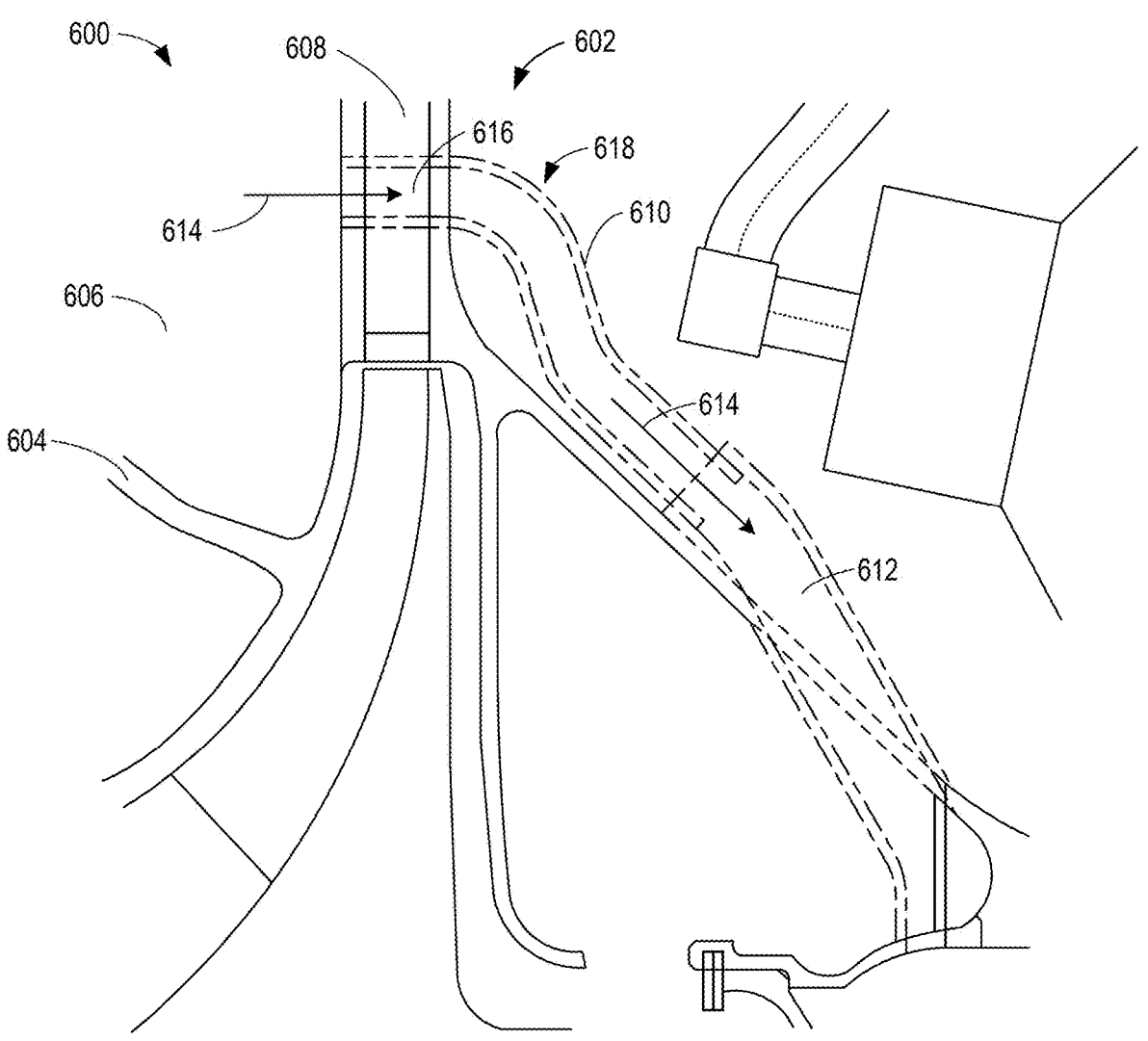
FIG. 6 is a cross-sectional view of another example bleed air system with another example diffuser in accordance with the teachings of this disclosure.

FIG. 6 illustrates a portion of another example engine 600. The engine 600 includes example bleed air system 602. The example bleed air system 602 includes an example frame 604 defining a bleed cavity 606, the example diffuser 608, an example tube 610, and an example port 612. The example bleed cavity 606 receives bleed air 614 from a primary flow path of a compressor of the engine 600. The diffuser 608 includes a bleed conduit 616. The diffuser 608 routes the bleed air 614 from a forward side of the diffuser 608 to the aft side of the diffuser 608 via the bleed conduit 616. The tube 610 receives the bleed air 614 on the aft side of the diffuser 608 and routes the bleed air 614 to at least one downstream sink (not shown in FIG. 6) for use by at least one aircraft and/or engine system. In some examples, the bleed air 614 travels from the forward side of the diffuser 608 to the aft side of the diffuser 608 entirely internal to the engine 600. In some examples, the tube(s) 610 includes at least one fluid control valve and at least one controller to control an amount of bleed air 614 routed to the at least one downstream sink. For example, the at least one controller may determine an aircraft and/or engine system no longer needs a supply of bleed air 614 and activate the at least one valve to restrict the flow of bleed air 614 to a first one of the at least one downstream sink.

In some examples, the bleed air system 602 is incorporated entirely within the engine 600. By containing the entire bleed air system 502 internal to the engine 600, the need for abatements to combat potential damage to the external components of the bleed air system 602 that can occur during installation, maintenance, and use is reduced and/or circumvented. In some examples, the bleed air system 602 does not include any check valves or redundant flow paths.

In some examples, the tube 610 is brazed or welded into place. In other examples, the tube 610 is additively formed. In some examples, the tube 610 and the port 612 are integrally formed. In some examples, the tube 610 includes at least one bend 618. In the illustrated example, the at least one bend 618 has a centerline bend radius equal to the diameter of the tube 610. In other examples, the at least one bend 618 has a centerline bend radius different than the diameter of the tube 610. The tube 610 of FIG. 6 has a consistent diameter throughout a length of the tube 610. In other examples, the diameter of the tube 610 is not constant throughout the tube 610. For example, the tube 610 may have a first diameter at a first location and a second diameter at a second location, the second diameter different than the first diameter. In some examples, the bleed air system 602 includes a plurality of tubes 610. A number of the tubes 610, a size of the tube(s) 610, and a shape of the tube(s) 610 may be determined by a number of factors including, for example, an amount of bleed air 614 for bleed air functions, a number of aircraft and/or engine systems that use bleed air 614, a number of surfaces that include at least one bleed conduit 616, a number of bleed conduits 616, and an amount of space in the engine 600 available for the tube(s) 610.

Figure 7:
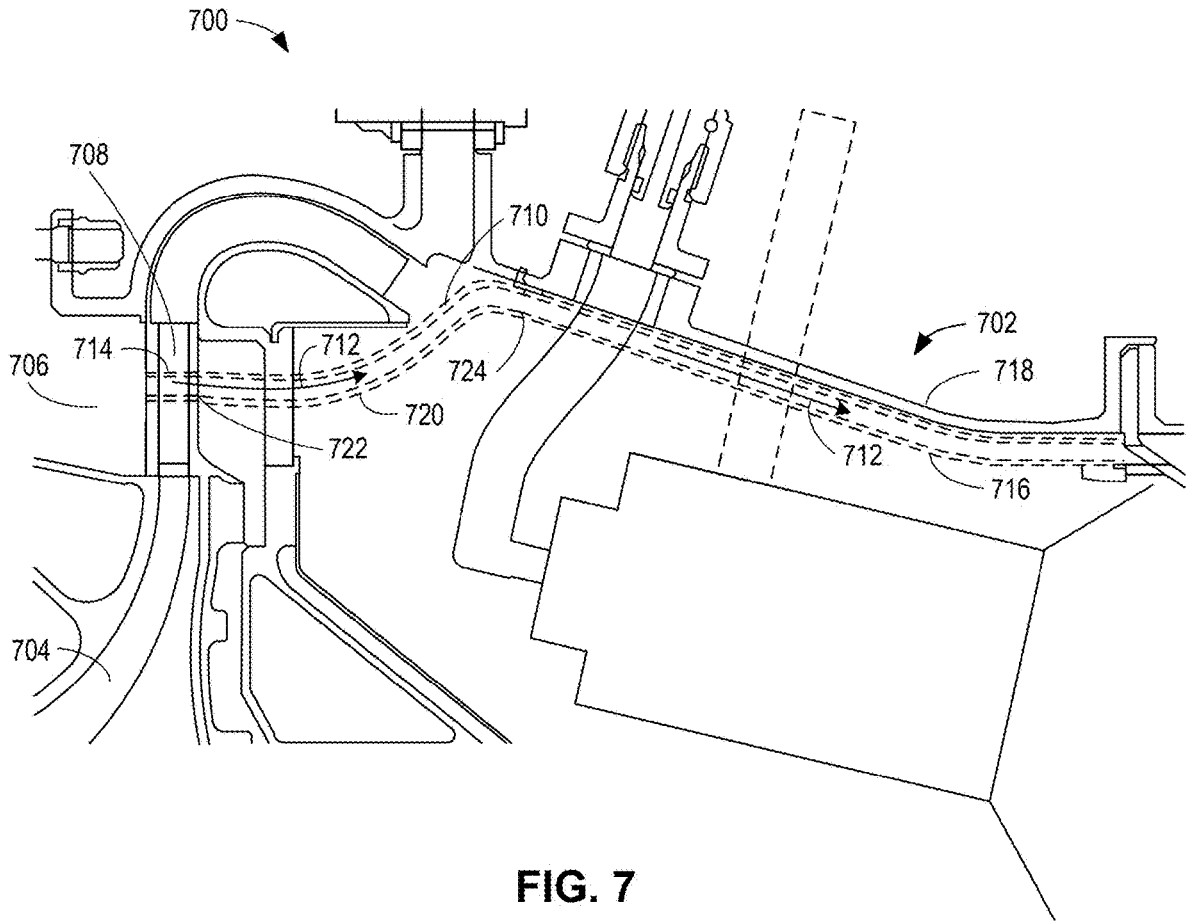
FIG. 7 is a cross-sectional view of another example bleed air system with another example diffuser in accordance with the teachings of this disclosure.

FIG. 7 illustrates a portion of another example engine 700. The engine 700 includes example bleed air system 702. The example bleed air system 702 includes an example frame 704 defining a bleed cavity 706, the example diffuser 708, and an example duct section 710. The example bleed cavity 706 receives bleed air 712 from a primary flow path of a compressor of the engine 700. The diffuser 708 includes a bleed conduit 714. The diffuser 708 routes the bleed air 712 from a forward side of the diffuser 708 to the aft side of the diffuser 708 via the bleed conduit 714. The duct section 710 receives the bleed air 712 on the aft side of the diffuser 708 and routes the bleed air 712 to at least one downstream sink (not shown in FIG. 7) for use by at least one aircraft and/or engine system. In some examples, the bleed air 712 travels from the forward side of the diffuser 708 to the aft side of the diffuser 708 entirely internal to the engine 700. In some examples, the duct section 710 includes at least one fluid control valve and at least one controller to control an amount of bleed air 712 routed to the at least one downstream sink. For example, the at least one controller may determine an aircraft and/or engine system no longer needs a supply of bleed air 712 and activates the at least one valve to restrict the flow of bleed air 712 to a first one of the at least one downstream sink.

In some examples, the bleed air system 702 is incorporated entirely within to the engine 700. By containing the entire bleed air system 702 internal to the engine 700, the need for abatements to combat potential damage to the external components of the bleed air system 702 that can occur during installation, maintenance, and use is reduced or eliminated. For example, the bleed air system 702 may not include any check valves or redundant flow paths. A first portion 716 of the duct section 710 forms a contour of an inside of a casing 718 of the engine 700. A second portion 720 of the duct section 710 is coupled to the aft side of the diffuser 708 at a first end 722 and connected to the first portion 716 of the duct section 710 at a second end 724. The duct section is fluidly coupled to the bleed conduit 714 and at least one downstream sink (not shown in FIG. 7). In some examples, a size of the duct section 710, and a shape of the duct section 710 may be determined by a number of factors including, for example, an amount of bleed air 712 for bleed air functions, a number of aircraft and/or engine systems that use bleed air 712 via the duct section 710, a number of surfaces that include at least one bleed conduit 714, a number of bleed conduits 714, and an amount of space in the engine 700 available for the duct section 710.

Figure 8:
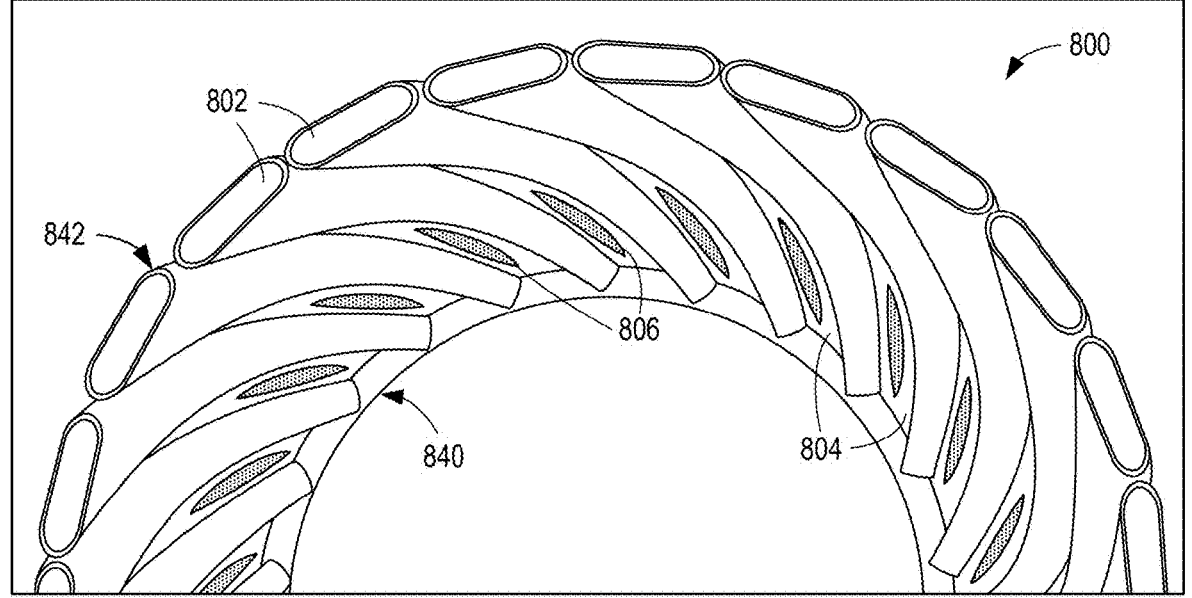
FIG. 8 is a cross-sectional view of a portion of another embodiment of the diffuser of FIG. 2 in accordance with the teachings of this disclosure.

FIG. 8 is a cross-sectional view of a portion of another embodiment of a diffuser 800 to provide cross-diffuser bleed in accordance with the teachings of this disclosure. The diffuser 800 includes a plurality of pipes 802, respective ones of the plurality of pipes 802 extending from an inner radius 840 of the diffuser 800 to an outer radius 842 of the diffuser 800. The plurality of pipes 802 define a plurality of discrete fluid passageways to split a flow of compressed air to be provided to a downstream combustor. In other examples, the discrete fluid passageways for the primary flow path to a downstream combustor are defined (e.g., formed) by vanes, pipes, holes, etc.

The plurality of pipes 802 are connected to each other by a plurality of connecting surfaces 804. At least one connecting surface of the plurality of connecting surfaces 804 includes at least one bleed conduit 806 to route bleed air from a forward side of the diffuser 800 to an aft side of the diffuser 800. In the illustrated example of FIG. 8, each of the plurality of connecting surfaces 804 includes one bleed conduit 806. In other examples, one or more of the plurality of connecting surfaces 804 includes fewer bleed conduits 806 (e.g., no bleed conduits 806) or more bleed conduits 806 (e.g., two bleed conduits 806, three bleed conduits 806, etc.).

In some examples, a number of bleed conduits 806 and a number of connecting surfaces 804 including at least one bleed conduit 806 is determined based on at least one of a number of factors, including but not limited to: an amount of bleed air required, a size of the connecting surfaces 804, a shape of the connecting surfaces 804, a number of connecting surfaces 804 in the diffuser 800, and a distance between connecting surfaces 804.

The cross-sectional shape of the bleed conduit(s) 806 can be circular, elliptical, square, triangular, rectangular, or other two-dimensional geometric shape. In some examples, the shape of the bleed conduit(s) 806 may be determined based on a number of factors including, but not limited to: an amount of bleed air required, a size of the connecting surfaces 804, a shape of the connecting surfaces 804, a number of connecting surfaces 804 in the diffuser 800, and a distance between connecting surfaces 804.

Figure 9:
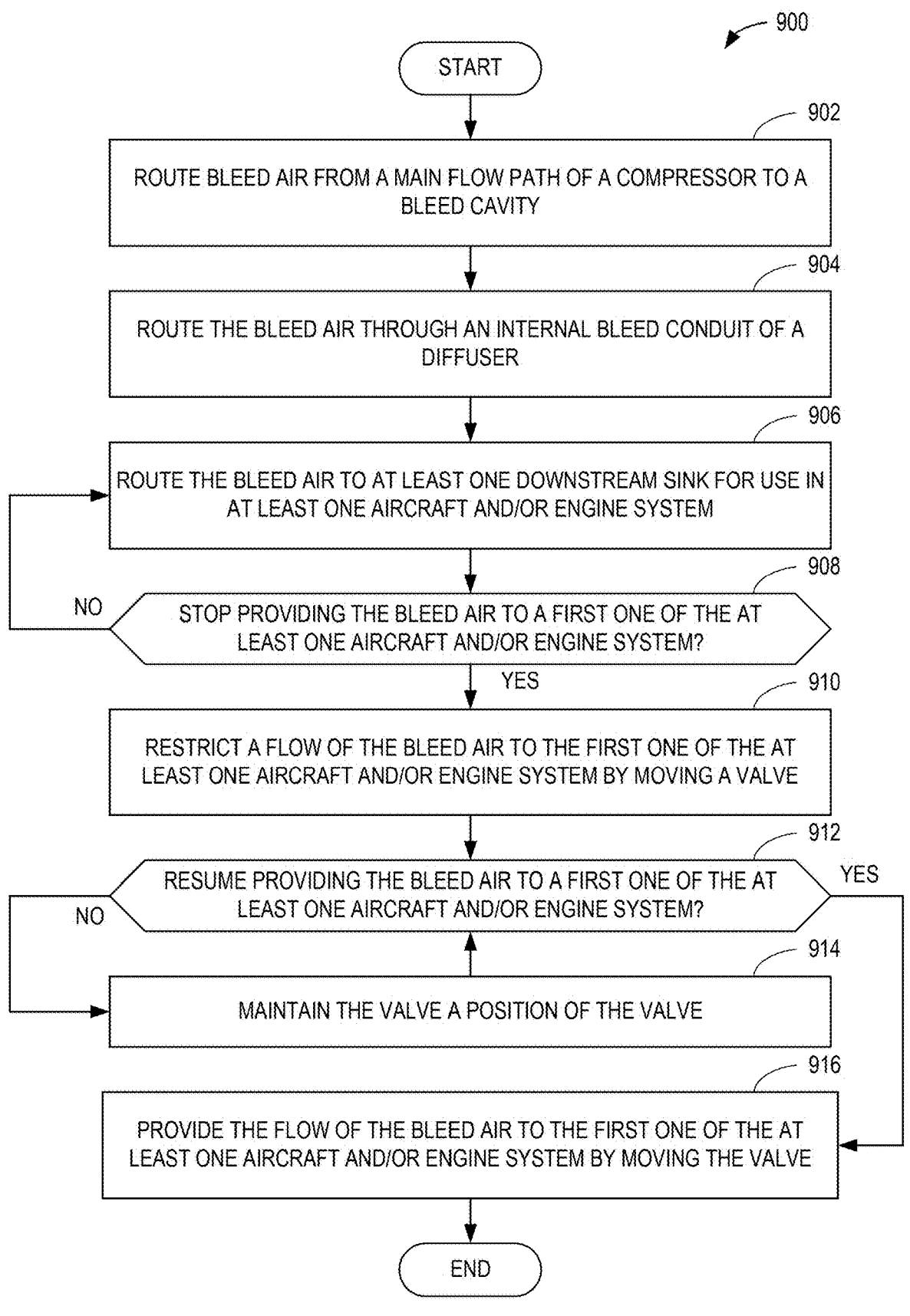
FIG. 9 is a flowchart representative of an example process for routing bleed air within an engine using the diffuser of FIG. 2 in accordance with the teachings of this disclosure.

FIG. 9 is a flowchart representative of an example process 900 for routing the bleed air within an engine using the one of the example diffusers 206, 800. The process 900 begins at block 902, at which point the bleed air is routed from the main flow path to the bleed cavity. The bleed air is routed from the main flow path before the main flow path enters the diffuser 206, 800. For example, the bleed air may be routed from the main flow path before the main flow path enters the impeller or between the impeller and diffuser 206, 800 stages of the compressor, on the forward side of the diffuser 206, 800.

At block 904, the bleed air is routed through the bleed conduit 230, 806 of the diffuser 206, 800, the bleed air passing from the bleed cavity on the forward side of the diffuser 206, 800 to the aft side of the diffuser 206, 800. In some examples, the bleed air is routed through a plurality of bleed conduits 230, 806. In some examples, respective ones of the plurality of bleed conduits 230, 806 are distributed between respective surfaces of a plurality of surfaces of the diffuser 206, 800.

After routing the bleed air through the bleed conduit 230, 806, at block 906, the bleed air is routed to at least one downstream sink via at least one passage positioned on the aft side of the diffuser 206, 800. In some examples, the at least one passage is implemented by the plurality of passages 510, the tube(s) 610, and/or the duct section 710. For example, the tube(s) 610 routes the bleed air to at least one downstream sink through the port 612.

At block 908, provision of the bleed air to a first aircraft or engine system of the at least one aircraft and/or engine system is evaluated. When supply of the bleed air to the first aircraft or engine system is to be continued (e.g., block 908 returns a result of NO), then the example process 900 returns to block 906. When supply of the bleed air to the first aircraft or engine system is to stop (e.g., block 908 returns a result of YES), control moves to block 910, at which a flow of the bleed air to the first aircraft or engine system is restricted by moving a valve from an open position to a closed position. For example, during takeoff, the supply of the bleed air may be restricted to maximize the amount of air in the main flow path to maximize thrust produced by a combustor. At block 912, resumption of the bleed air to the first aircraft or engine system is evaluated. When flow of the bleed air to the first aircraft or engine system is to continue being restricted (e.g., block 912 returns a result of NO), at block 914, the valve is maintained in the closed position. When flow of the bleed air to the first aircraft or engine system is to be resumed (e.g., block 912 returns a result of YES), at block 916, the valve is moved from the closed position to the open position to provide the flow of bleed air to the first aircraft or engine system. For example, when a desired thrust produced by the engine does not require the maximum amount of air in the main flow path, the bleed air may be provided to support aircraft and/or engine systems that utilize the bleed air.

Figure 10:
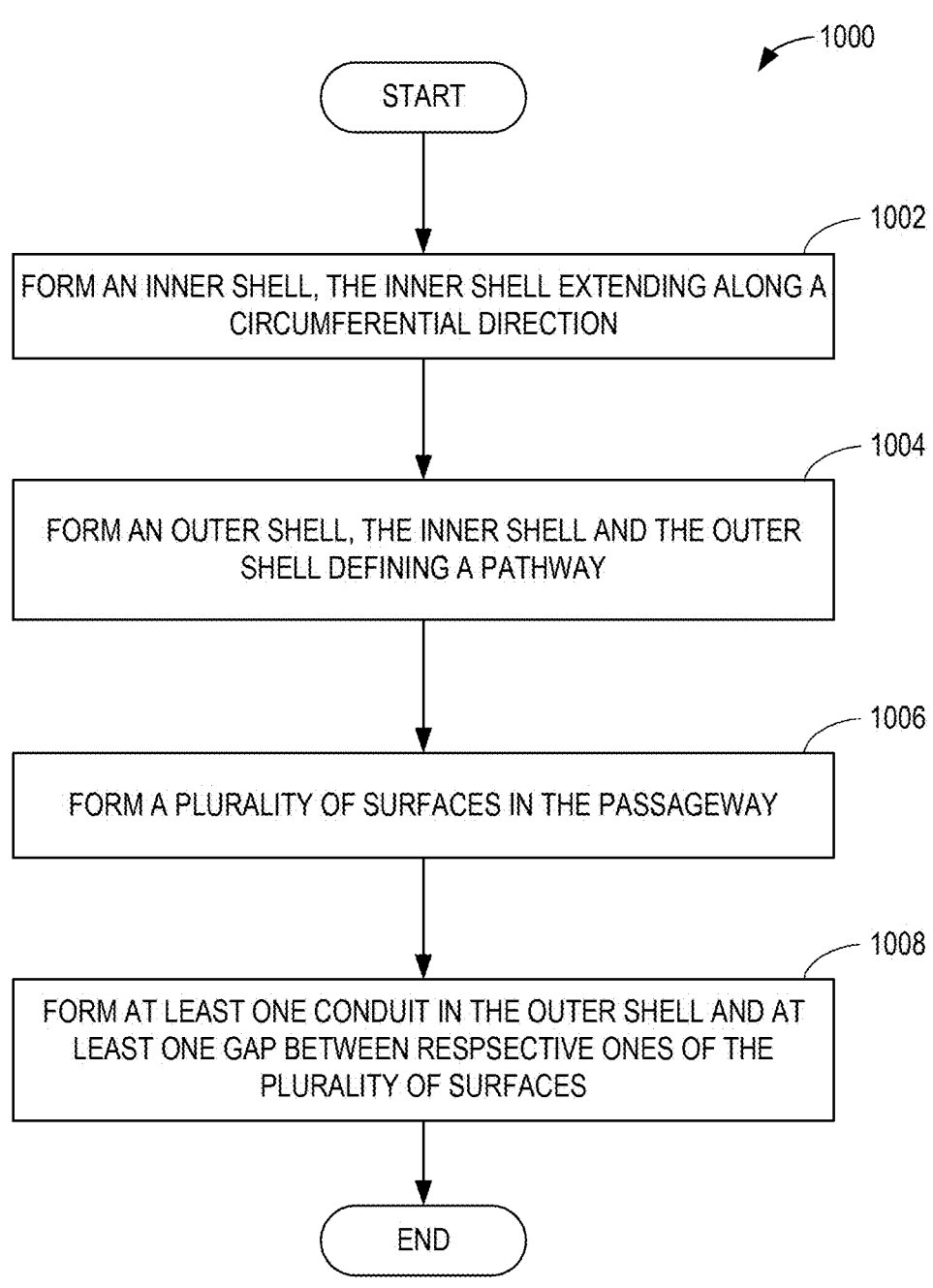
FIG. 10 is a flowchart representative of an example process of manufacturing the example diffuser of FIG. 2 in accordance with the teachings of this disclosure.

FIG. 10 is a flowchart representative of an example process 1000 of manufacturing the example diffuser 206, 800. The example process 1000 begins at block 1002, at which point an inner shell is formed, the inner shell extending along the circumferential direction C. At block 1004, an outer shell is formed, the outer shell extending along the circumferential direction C and spaced apart from the inner shell in the radial direction R such that the inner shell and the outer shell define a passageway. At block 1006, the plurality of surfaces defining a plurality of discrete passageways are formed. In some examples, the plurality of surfaces is a plurality of diffuser vanes 306, a plurality of pipes 802, a plurality of holes, etc. In some examples, forming the inner shell, the outer shell, and/or the plurality of surfaces includes depositing and fusing an additive material. In some examples, blocks 1002, 1004, and 1006 are performed together. In some examples, the inner shell, the outer shell, and/or the plurality of surfaces are integrally formed. In other examples, the inner shell, the outer shell, and/or the plurality of surfaces are distinct. In some examples, the inner shell, the outer shell, and/or the plurality of surfaces are connected by brazing, welding, fastening, and/or other methods of connecting distinct mechanical components. At block 1008, at least one bleed conduit 230, 806 is formed in the outer shell and in at least one gap between the plurality of discrete passageways. The bleed conduit 230, 806 has a first end on a first side of the diffuser and a second end on the second side of the diffuser 206, 800 to pass bleed air through the diffuser 206, 800 from the first side to the second side.

In some examples, any combination of blocks 1002, 1004, 1006, and 1008 of example process 1000 may be performed collectively. For example, each of blocks 1002-1008 may be performed in a single action if the diffuser 206, 800 is manufactured by additive manufacturing, casting, injection molding, etc.

From the foregoing, it will be appreciated that example systems, apparatus, articles of manufacture, and methods have been disclosed that provide bleed air to downstream sinks via a bleed air path internal to the gas turbine engine with a reduced bleed air path length, a reduced part count, reduced weight, reduced cost, improved durability, and improved maintainability. Bleed air systems disclosed herein route bleed air from a forward side of the diffuser to an aft side of the diffuser via a bleed conduit. Example systems, apparatus, articles of manufacture, and method disclosed herein also enable reduced nacelle drag by reducing the frontal area of the engine by removing the need for external bleed air system components.

Further examples are provided by the subject matter of the following clauses:

A gas turbine engine includes a frame defining a cavity in a forward side of a diffuser of the gas turbine engine; a compressor including the diffuser, the diffuser defining a primary flow path to provide air flow to a combustor and including at least one conduit, the at least one conduit fluidly coupled to the cavity; and a downstream sink fluidly coupled to the cavity via the at least one conduit defining at least a portion of a bleed air path.

The gas turbine engine of any preceding clause, further including at least one passage fluidly coupled to one or more of the at least one conduit, and the downstream sink.

The gas turbine engine of any preceding clause, further including a tube coupled to the diffuser, the tube fluidly coupled to the cavity via one or more of the at least one conduit.

The gas turbine engine of any preceding clause, further including a port, wherein the tube extends through an entrance of the port fluidly.

The gas turbine engine of any preceding clause, wherein a shape of a cross-section of one or more of the at least one conduit is one of circular, elliptical, and rectangular.

The gas turbine engine of any preceding clause, wherein the compressor is a centrifugal compressor and wherein the bleed air path is located internal to the gas turbine engine.

The gas turbine engine of any preceding clause, wherein the diffuser includes a plurality of diffuser vanes defining the primary flow path and the at least one conduit positioned in at least one diffuser vane of the plurality of diffuser vanes.

The gas turbine engine of any preceding clause, wherein the diffuser includes a plurality of pipes defining the primary flow path, the at least one conduit positioned between respective pipes of the plurality of pipes.

The gas turbine engine of any preceding clause, wherein the downstream sink is a first downstream sink and the bleed air path is a first bleed air path, the gas turbine engine further including a second downstream sink fluidly coupled to one or more of the at least one conduit and a second bleed air path, wherein a first portion of bleed air is to travel from the cavity to the first downstream sink via the first bleed air path and a second portion of bleed air is to travel from the cavity to the second downstream sink via the second bleed air path.

The gas turbine engine of any preceding clause, wherein the cavity receives the bleed air from a flow path supplying air to the primary flow path.

The gas turbine engine of any preceding clause, wherein bleed air is passively provided to the downstream sink.

The gas turbine engine of any preceding clause, further including a fluid control valve fluidly coupled between one or more of the at least one conduit and the downstream sink.

The gas turbine engine of any preceding clause, wherein the fluid control valve is operable between an open position and a closed position, bleed air provided to the downstream sink when the valve is in the open position and bleed air restricted from flowing to the downstream sink when the valve is in the closed position.

The gas turbine engine of any preceding clause, wherein the diffuser includes an inner shell and an outer shell, the plurality of diffuser vanes between the inner shell and the outer shell.

The gas turbine engine of any preceding clause, wherein the diffuser is additively manufactured.

A diffuser for routing bleed air within a gas turbine engine, the diffuser including: an inner shell; an outer shell; and a plurality of surfaces between the inner shell and the outer shell, the plurality of surfaces defining a plurality of discrete passageways, at least one conduit positioned between respective passageways of the plurality of discrete passageways, the at least one conduit fluidly connected to a cavity positioned on a first side of the diffuser, and the at least one conduit fluidly connected to a downstream sink positioned on a second side of the diffuser, the at least one conduit defining at least a portion of a bleed air path.

The diffuser of any preceding clause, wherein one or more of the at least one conduit is fluidly coupled to the downstream sink via at least one passage.

The diffuser of any preceding clause, wherein the diffuser is coupled to a tube on the second side of the diffuser.

The diffuser of any preceding clause, wherein a shape of a cross-section of one or more of the at least one conduit is one of circular, elliptical, and rectangular.

The diffuser of any preceding clause, wherein the diffuser is additively manufactured.

The diffuser of any preceding clause, wherein the downstream sink is a first downstream sink, the at least one conduit including a first conduit between first passageways of the plurality of discrete passageways and a second conduit between second passageways of the plurality of discrete passageways, a first portion of the bleed air to pass from the cavity to the first downstream sink via the first conduit and a second portion of the bleed air to pass from the cavity to a second downstream sink via the second conduit.

The diffuser of any preceding clause, wherein the plurality of discrete passageways provide a primary flow path supplying air to a combustor.

The diffuser of any preceding clause, wherein the plurality of surfaces is a plurality of diffuser vanes, the at least one conduit positioned in at least one of the plurality of diffuser vanes.

The diffuser of any preceding clause, wherein the plurality of surfaces is a plurality of pipes, the at least one conduit positioned between respective pipes of the plurality of pipes.

A bleed air system for an aircraft, the bleed air system including: a frame defining a cavity; a diffuser to provide air to a combustor via primary flow path, the diffuser including: at least one diffuser vane in the primary flow path; and at least one conduit in one or more of the at least one diffuser vane, the at least one conduit fluidly coupled to the cavity, the at least one conduit defining at least a portion of a bleed air path through the at least one diffuser vane; a passage coupled to the at least one conduit at a first end of the passage; and a downstream sink coupled to the passage at a second end of the passage, the downstream sink fluidly coupled to the cavity via the at least one conduit and the passage.

A method for manufacturing a diffuser to route bleed air internal to a gas turbine engine includes forming an inner shell extending along a circumferential direction; forming an outer shell extending along the circumferential direction, the outer shell spaced apart from the inner shell in a radial direction, the inner shell and the outer shell to define a passageway; forming a plurality of surfaces to define a plurality of discrete passageways in the passageway; and creating at least one conduit in the outer shell and at least one surface of the plurality of surfaces.

The method of any preceding clause, wherein forming the inner shell, forming the outer shell, and forming the plurality of surfaces to define a plurality of discrete passageways includes depositing and fusing an additive material.

The method of any preceding clause, wherein creating the at least one conduit includes drilling into the outer shell and the at least one surface.

The method of any preceding clause, wherein a shape of a cross-section of one or more of the at least one conduit is one of circular, elliptical, or rectangular.

A method including routing bleed air from a main flow path of a compressor to a bleed cavity and routing the bleed air through an internal bleed conduit of a diffuser.

The method of any preceding clause, further including routing the bleed air to at least one downstream sink for use in at least one aircraft system or engine system.

The method of any preceding clause, further including determining whether to stop providing the bleed air to a first one of the at least one aircraft system or engine system.

The method of any preceding clause, further including restricting a flow of the bleed air to the first one of the at least one aircraft system or engine system by moving a valve.

The method of any preceding clause, further including determining whether to resume providing the bleed air to the first one of the at least one aircraft system or engine system.

The method of any preceding clause, further including maintaining a position of the valve.

The method of any preceding clause, further including providing the bleed air to the first one of the at least one aircraft system or engine system by moving the valve.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A gas turbine engine, comprising:
   a frame defining a cavity in a forward side of a diffuser of the gas turbine engine;
   a compressor including the diffuser, the diffuser defining a primary flow path to provide air flow to a combustor, wherein the primary flow path includes at least one diffuser vane including a first conduit and a second conduit, the first conduit and the second conduit fluidly coupled to the cavity, and wherein the first conduit has a greater cross-sectional area than the second conduit; and
   a downstream sink fluidly coupled to the cavity via the first conduit and the second conduit defining at least a portion of a bleed air path.

2. The gas turbine engine of claim 1, further including at least one passage fluidly coupled to the first conduit, the second conduit, and the downstream sink.

3. The gas turbine engine of claim 1, further including a tube coupled to the diffuser, the tube fluidly coupled to the cavity via the first conduit and the second conduit.

4. The gas turbine engine of claim 3, further including a port, wherein the tube extends through an entrance of the port to be fluidly connected to the downstream sink.

5. The gas turbine engine of claim 1, wherein a shape of a cross-section of the first conduit and/or the second conduit is one of circular, elliptical, or rectangular, respectively.

6. The gas turbine engine of claim 1, wherein the compressor is a centrifugal compressor and wherein the bleed air path is located internal to the gas turbine engine.

7. The gas turbine engine of claim 1, wherein the downstream sink is a first downstream sink and the bleed air path is a first bleed air path, the gas turbine engine further including a second downstream sink fluidly coupled to at least one more of the first conduit and the second conduit and a second bleed air path, wherein a first portion of a bleed air is to travel from the cavity to the first downstream sink via the first bleed air path and a second portion of bleed air is to travel from the cavity to the second downstream sink via the second the bleed air path.

8. The gas turbine engine of claim 1, wherein the cavity receives bleed air from a flow path supplying the air flow to the primary flow path.

9. A diffuser for routing a bleed air within a gas turbine engine, the diffuser comprising:

an inner shell;

an outer shell; and a plurality of surfaces between the inner shell and the outer shell, the plurality of surfaces defining a plurality of discrete passageways, a first conduit and a second conduit positioned between directly consecutive passageways of the plurality of discrete passageways, the first conduit and the second conduit fluidly connected to a cavity positioned on a first side of the diffuser, and the first conduit and the second conduit fluidly connected to a downstream sink positioned on a second side of the diffuser, the first conduit and the second conduit defining at least a portion of a bleed air path, and the first conduit has a greater cross-sectional area than the second conduit.

10. The diffuser of claim 9, wherein the first conduit and the second conduit are fluidly coupled to the downstream sink via at least one passage.

11. The diffuser of claim 9, wherein the diffuser is coupled to a tube on the second side of the diffuser.

12. The diffuser of claim 9, wherein a shape of a cross-section of the first conduit and/or the second conduit is one of circular, elliptical, or rectangular, respectively.

13. The diffuser of claim 9, wherein the diffuser is additively manufactured.

14. The diffuser of claim 9, wherein the downstream sink is a first downstream sink, the first conduit and the second conduit are between first directly consecutive passageways and a third conduit is between second directly consecutive passageways of the plurality of discrete passageways, a first portion of the bleed air to pass from the cavity to the first downstream sink via the first conduit and the second conduit and a second portion of the bleed air to pass from the cavity to a second downstream sink via the third conduit.

15. The diffuser of claim 9, wherein the plurality of discrete passageways provide a primary flow path supplying air to a combustor.

16. The diffuser of claim 9, wherein the plurality of surfaces is a plurality of surfaces of diffuser vanes, the first conduit and the second conduit positioned in at least one of the plurality of surfaces of diffuser vanes.

17. A bleed air system for an aircraft, the bleed air system comprising:

a frame defining a cavity;

a diffuser to provide air to a combustor via a primary flow path, the diffuser including:

at least one diffuser vane in the primary flow path; and a first conduit and a second conduit in the at least one diffuser vane, the first conduit and the second conduit fluidly coupled to the cavity, the first conduit and the second conduit defining at least a portion of a bleed air path through the at least one diffuser vane, the first conduit has a greater cross-sectional area than the second conduit;

a passage coupled to the first conduit and the second conduit at a first end of the passage; and a downstream sink coupled to the passage at a second end of the passage, the downstream sink fluidly coupled to the cavity via the first conduit, the second conduit, and the passage.

* * * * *